Nov. 18, 1952     A. M. UTTLEY     2,618,154
NAVIGATING INSTRUMENT
Filed July 25, 1947

Inventor
A. M. Uttley
By
Attorney

Patented Nov. 18, 1952

2,618,154

UNITED STATES PATENT OFFICE 2,618,154

NAVIGATING INSTRUMENT

Albert M. Uttley, Malvern, England

Application July 25, 1947, Serial No. 763,509
In Great Britain June 6, 1945

Section 1, Public Law 690, August 8, 1946
Patent expires June 6, 1965

10 Claims. (Cl. 73—178)

This invention relates to improvements in navigating instruments, and has for its object the provision of an instrument capable of giving the pilot of an aircraft a direct visual indication, in a form which can be readily assimilated and instantly acted upon, of the bearing of the aircraft relative to an objective, and the permissible limits within which the bearing must lie at any instant if, without exceeding a predetermined rate of turn, the aircraft is to pass over the objective, or track on to the objective from a point at some predetermined distance from it. Preferably, the distance to go to the said point or to the objective is also indicated.

Figure 1:
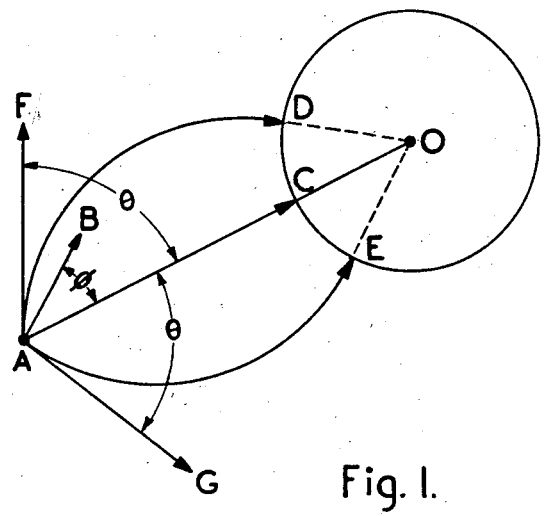
Figure 2:
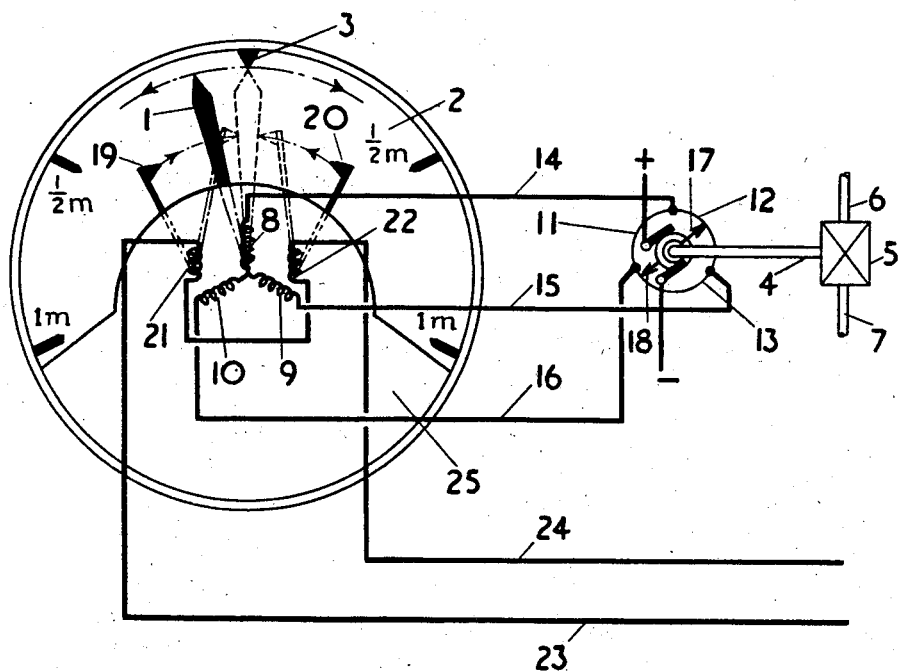

In the drawings, Figure 1 is a diagram of certain vectors useful in describing the invention, and Figure 2 is a schematic arrangement of an indicating instrument in accordance with the preferred form of the invention.

The object of the invention will be more readily understood if reference is made to Fig. 1 of the drawings. The aircraft is assumed to be at the point A and is required to be tracking on to an objective O on reaching some predetermined radius therefrom such as any point on the circle shown. The objective may, for example, be a bombing target in which case the circle is the bombing circle or the objective may be an aerodrome to which the aircraft is attempting to home, in which case the circle may be of some arbitrary radius within which the pilot is able to navigate by visual recognition or other methods. If the aircraft is required to be navigated by means of the invention until it passes over the objective it will be understood to be the limiting case when the radius of the said circle is zero.

It may not be desirable for the aircraft to follow a direct course to the objective because, for example, of enemy counteraction or because of some prohibited or obstructed zone and a certain freedom to weave is then necessary. Consequently the aircraft will be assumed to be moving at the instant depicted in a direction AB on a bearing $\phi$ relative to the direction of the objective O.

The curvature of the tracks AD and AE represents the maximum predetermined rate of turn for the craft in question. The vectors AF and AG are tangents to these curved tracks, respectively, at the point A and the bearing of each relative to the directions of the objective O is $\theta$. It is clear that if at any instant the bearing $\phi$ of the aircraft exceeds the angle $\theta$ it will be impossible for the aircraft to be tracking on to the objective O by the time it reaches the circle (or to pass over the objective), and consequently $\theta$ is the weave tolerance at the instant in question. As hereinbefore stated therefore, the object of the invention is to indicate to the pilot in an advantageous manner the bearing $\phi$ of the aircraft, the weave tolerance $\theta$ at any instant during the approach to the objective, thus enabling the pilot to weave as circumstances demand to the limit of the weave tolerance at any instant, and the distance to go AC.

A navigating instrument according to the invention comprises means for indicating graphically in correlation the instantaneous bearing of an aircraft relative to an objective and the weave tolerance at that instant, the correlation being such that the weave tolerance indications delineate the limits of a region on the display within which the bearing indication must be maintained if the aircraft is to pass over the objective or is to track on to the objective from a point at some predetermined distance therefrom without exceeding a predetermined rate of turn. It can be shown that at any instant the value of the weave tolerance angle $\theta$ is approximately proportional to the distance to go, i. e. the distance AC in Fig. 1, and hence, according to the invention, the graphical representation of the weave tolerance is controlled in accordance with the distance to go and is used also to indicate said distance. In the preferred embodiment of the invention described hereinbelow the representation of the weave tolerance on each side of the direction of the objective takes the form of pointers operated by a moving coil electrical instrument movement to which voltage proportional to the distance to go is applied. Such a voltage is delivered automatically by certain radar navigational apparatus.

In order that the invention may be more readily understood reference is directed to the accompanying drawings in which:

Fig. 1, which as already been referred to, is a diagram of the vectors involved in the invention, and Fig. 2 is a schematic arrangement of an indicating instrument in accordance with the preferred embodiment of the invention.

The instrument illustrated in Fig. 2 comprises a pointer 1 pivoted at the centre of a dial 2 and adapted to indicate the instantaneous bearing of the aircraft in relation to the object by reference to a fixed datum mark 3. The movement of the pointer is decided by the movement of a shaft 4 which is driven through a differential gear 5 from shafts 6 and 7 which are components of a navigating apparatus distinct from the present invention. Shaft 6 is automatically positioned angularly by said apparatus in relation to the bearing (AC) of the objective and shaft 7 is similarly positioned in relation to the track (AB) of the aircraft and hence the differential of the two angular displacements appears as an angular displacement of the shaft 4 equal to the angle $\phi$. The pointer 1 is caused to copy the movement of the shaft 4 by, for example, a direct current follow-up system comprising star-connected field windings, 8, 9 and 10 in the instrument, which influence an iron armature (not shown) attached to the pointer 1, and delta-connected resistance elements 11, 12 and 13 joined by three lines 14, 15 and 16 to the said field windings. Two oppositely extending wiper arms 17 and 18 fixed to the shaft 4, but insulated from each other, are fed from the positive and negative poles, respectively, of a direct current source and are adapted to wipe continuously upon the resistance elements 11, 12 and 13 as the shaft 4 rotates. The arrangement is such that the resultant field due to the three field windings 8, 9 and 10 rotates in phase with the wiper arms 17 and 18 and consequently the iron armature carrying the pointer 1 follows up the movements of the shaft 4. This particular follow-up system forms no part of the present invention, however.

Mounted on each side of the pointer 1 are two further pointers 19 and 20 controlled by moving coils 21 and 22, respectively, which are connected in series and supplied with current through leads 23 and 24 from a source the potential of which is automatically varied by further navigating apparatus distinct from this invention, so as to be proportional to the distance to go (the distance AC in Fig. 1). The design is such that the inwardly directed apices of the pointers 19 and 20 meet substantially on the vertical centre line through the datum mark 3 of the dial 2 when no potential is applied whereas when the potential exceeds a certain maximum determined by the maximum distance AC (Fig. 1) over which the invention is required to function, the pointers 19 and 20 move behind a mask 25. A scale representing distance to go, say in miles as shown, is provided on the dial to be read in association with the pointers 19 and 20.

In operation, when the aircraft is near enough to the chosen objective to be within the operating range of the associated navigating apparatus which controls the indicating instrument, the direction pointer 1 indicates the track of the aircraft with reference to the objective represented by the datum mark 3 and the weave tolerance pointers 19 and 20 begin to appear from behind the mask 25 and move towards each other. During this time the pilot can, if necessary, weave the aircraft in any direction so long as the pointer 1 does not move outside the angle included between the pointers 19 and 20. The closer the aircraft approaches the objective the smaller the included angle becomes and the less freedom there is to weave but at any instant the maximum weave tolerance is clearly displayed and correlated with the bearing of the aircraft and the distance to go is indicated on the scale of miles. Ultimately, when the circle (Fig. 1) is reached the weave tolerance pointers are in the position shown in chain lines in Fig. 2, the distance to go is zero, and there is no tolerance indicated, the only allowable position for the direction pointer 1 being in register with the datum mark 3, as shown in chain lines. The aircraft is then some predetermined distance from the objective and tracking straight for it or is over the objective in the limiting case when the circle is of zero radius and the distance to go is equal to the distance away of the objective.

It will be appreciated that the aircraft on reaching the circle, or the objective in said limiting case, will not necessarily be flying on a straight track but may, in fact, be executing the predetermined maximum rate of turn.

I claim:

1. A navigating instrument for a moving craft comprising a first pointer, means responsive to the deviation of the craft from a particular bearing for controlling the position of said first pointer to thereby indicate the instantaneous bearing of said craft relative to an objective, second and third pointers arranged one on each side of said first pointer, and means responsive to the distance of said craft from a predetermined objective for controlling said second and third pointers in accordance with the distance to go thereby providing an indication of the instantaneous weave tolerance, said second and third pointers being moved toward one another as said craft approaches said objective to delimit therebetween a varying weave tolerance indication in which said first pointer may be moved.

2. A navigating instrument comprising a circular dial, a first pointer, means responsive to the instantaneous bearing of an aircraft relative to an objective for moving said first pointer over said dial, second and third pointers arranged one on each side of said first pointer, and means responsive to the distance of said aircraft from said objective for moving said second and third pointers in opposite directions and toward one another over said dial, said second and third pointers delimiting a dial area therebetween indicative of the instantaneous weave tolerance of said aircraft within which tolerance said first pointer may be moved without the aircraft failing to intersect said objective.

3. A navigating instrument as claimed in claim 2 wherein said circular dial is graduated in distance units to enable the distance to go to be read in accordance with the instantaneous position of either of said second and third pointers.

4. A navigating instrument for use in an aircraft comprising a circular dial, a datum mark on said dial representing the bearing of an objective, a first pointer, means responsive to the instantaneous bearing of said aircraft relative to said objective for moving said pointer on either side of said datum mark, second and third pointers arranged one on each side of said first pointer, means responsive to the distance of said aircraft from said objective for moving said second and third pointers towards said first pointer in opposite directions to thereby delimit between said second and third pointers a varying dial area indicative of the instantaneous weave tolerance, within which tolerance the bearing of said aircraft, as indicated by said first pointer, may be varied, and a scale on said dial representing distance to go which is located along the paths of motion of said second and third pointers.

5. A navigating instrument for use in a craft comprising an arcuate scale, first indicating means mounted adjacent said scale, first control means responsive to the bearing of said craft relative to a predetermined objective and operatively coupled to said first indicating means for moving said first indicating means across said scale, second indicating means mounted adjacent said scale, second control means responsive to the distance of said craft from said objective and operatively coupled to said second indicating means for moving said second indicating means across said scale, said first and second indicating means being so arranged that they approach the same scale position as said craft approaches its objective, the differential between the instantaneous indications of said first and second indicating means being indicative of the maximum instantaneous weave tolerance of said craft as determined by the bearing of the craft, distance of the craft from its objective, and a predetermined maximum rate of turn of said craft.

6. In a device useful in navigating a craft, a scale plate having a datum line thereon, a first pointer movable in a plane parallel to that of the scale plate about an axis perpendicular thereto, first automatic means on said craft for continuously determining the bearing of the craft, means responsive to said first automatic means for moving said first pointer in alignment with said datum line when the craft is tracking a particular bearing and to angular positions with respect to said datum line according to variations in the direction of said craft from said bearing, a second pointer movable in a plane close to, parallel with and in front of said scale plate, a third pointer movable in a plane close to, parallel with and in front of said scale plate, means mounting said second and third pointers for rotation respectively about axes that are adjacent to the axis of said said first pointer, second automatic means on said craft for continuously determining the distance of said craft from a predetermined objective, and means responsive to said second automatic means for rotating said second and third pointers in opposite angular directions and toward said datum line, said second and third pointers being moved at such a rate and over such a range relative to the rate and range of movement of said first pointer as to cause said second and third pointers to be positioned at all times within the useful range of the device at points which coincide with positions to which said first pointer would move if the bearing of the aircraft corresponded to the weave tolerance.

7. The device defined in claim 6 in which said scale plate has graduations cooperating with said second and third pointers.

8. In combination in an aircraft, first automatic means for continuously determining the bearing deviation of the aircraft with relation to a particular bearing, second automatic means for continuously determining the distance of said aircraft from an objective, and a navigating instrument comprising means responsive to the operation of said first automatic means for indicating visually the bearing of the aircraft and means responsive to the operation of said second automatic means for indicating the distance to go thereby providing a continuous indication of the weave tolerance, said last-named means including means whereby the weave tolerance indications delineate the limits within which the bearing indication must be maintained if the aircraft is to reach the objective without exceeding a predetermined rate of turn.

9. A navigating instrument for use in an aircraft comprising a circular dial, a first pointer, automatically operating means for determining the instantaneous bearing of said aircraft and for producing a current proportional to said instantaneous bearing, means operatively coupled to said first pointer and responsive to said current to move said first pointer over said dial to indicate the instantaneous bearing of said aircraft, second and third pointers arranged one on each side of said first pointer, a moving coil operatively coupled to each of said second and third pointers, a source of potential for feeding current through said two coils in series, said source of potential being automatically variable in proportion to the distance to go whereby said second and third pointers move towards said first pointer in opposite directions at such a rate and over such a range relative to the rate and range of movement of said first pointer as to cause said second and third pointers to be positioned at all times within the useful range of the instrument at points which coincide with positions to which said first pointer would move if the bearing of the aircraft corresponded to the weave tolerance, and a scale on said dial representing distance to go which is adjacent the paths of motion of said second and third pointers.

10. A navigating instrument as claimed in claim 9 wherein a mask partially covers the face of said dial and is arranged in relation to the second and third pointers so that said second and third pointers move behind the mask when said potential exceeds a predetermined value, said predetermined value being dependent at least in part upon a predetermined rate of turn of said aircraft, whereby said aircraft may reach its objective without exceeding said predetermined rate of turn when said aircraft is within the maximum distance which can be indicated by said second and third pointers unobscured by said mask.

ALBERT M. UTTLEY.

REFERENCES CITED

The following references are of record in the file of this patent:

UNITED STATES PATENTS

| Number | Name | Date |
| --- | --- | --- |
| 2,070,178 | Pottenger et al. | Feb. 9, 1937 |
| 2,439,381 | Darlington | Apr. 13, 1948 |

FOREIGN PATENTS

| Number | Country | Date |
| --- | --- | --- |
| 376,282 | Great Britain | June 29, 1932 |